J. A. CALVERT.
BINDER.
APPLICATION FILED AUG. 5, 1919.

1,337,193. Patented Apr. 20, 1920.

INVENTOR
JOHN A. CALVERT
BY Featherstonhaugh & Co.
ATTY'S

UNITED STATES PATENT OFFICE.

JOHN ALBERT CALVERT, OF CARBERRY, MANITOBA, CANADA.

BINDER.

1,337,193. Specification of Letters Patent. Patented Apr. 20, 1920.

Application filed August 5, 1919. Serial No. 315,429.

*To all whom it may concern:*

Be it known that I, JOHN ALBERT CALVERT, a subject of the King of Great Britain, residing in the town of Carberry, in the Province of Manitoba, Dominion of Canada, have invented certain new and useful Improvements in Binders, of which the following is a specification.

This invention relates to binders, and the objects of the invention are to prevent the grain from being thrown too far back on a conveying apron which is operable adjacent to and rearwardly of a cutting bar of the ordinary binders, and to permit of the grain being delivered to the apron in that position best calculated to increase the efficiency of the machine and effect a saving of the grain. Further objects are to so construct the slats of the reel that they will uniformly engage the grain without violent impact and press the same over and will not tend to shell the grain, and tend to place the grain uniformly on the said apron.

The invention consists essentially of the improved construction hereinafter described in detail in the accompanying specification and drawings.

In the drawings.

Like characters of reference refer to like parts in the several figures.

Figure 1:
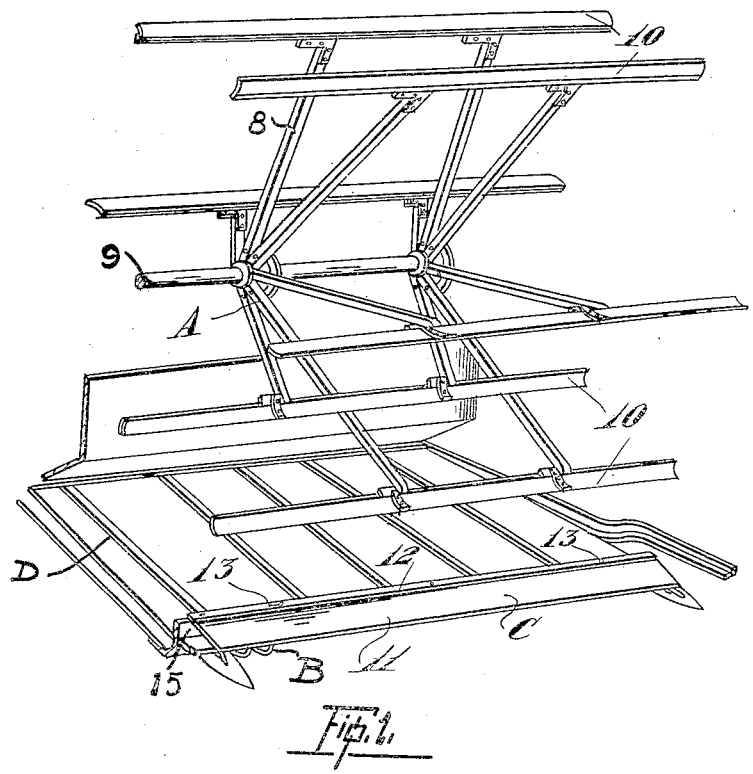
Figure 1 is a perspective view of the reel of a binder having my attachment thereon.
Figures 2, 3:
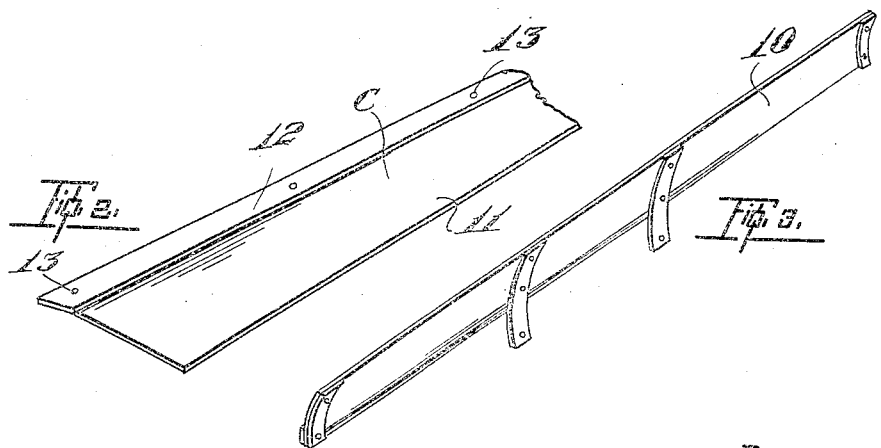
Fig. 2 is a perspective view of my attachment adapted to be fitted to the cutting bar.
Fig. 3 is a perspective view of one of the reel slats.

Referring to the drawings, A represents the binder reel comprising a shaft 9, carrying spider 8 on the outer ends of which the slats 10 are mounted, the said shaft being rotated from any suitable source of power and in a manner common to ordinary binders at present in use.

The slats of the binder reel form an important part of my invention and are formed curvilinear in cross section, and the rounded face slat is adapted to engage with the grain during the cutting operation and press the grain downwardly as will be hereinafter explained.

The cutting bar B of the machine may be provided with the usual reciprocable teeth operated in any suitable manner, and the bar *per se* does not form a part of the present invention so that it is thought unnecessary to further describe the same.

Under ordinary circumstances when grain is cut by the cutting bar B it is thrown rearwardly onto the endless apron D and generally the grain is not properly and uniformly delivered to the apron, that is to say, it is not lying in the desired position to permit of the machine performing its work in the most effective manner.

To facilitate delivering the grain to the apron D in such a manner that the grain will lie in the desired position on the apron, I provide an attachment for the cutting bar comprising a plate C which is located above the cutting bar, the said plate being formed with a forwardly inclined portion 11, and a rear attaching portion 12 having perforations 13 through which securing bolts may extend. The plate C constituting an improved smooth face bar is placed just above the knives, but not on the canvas of the endless apron D. The plate C may be supported from a bar 15 on the binder frame, to which it is bolted. It will be understood that the plate C does not cover the whole of the cutting element, but that the reciprocable teeth project beyond the inclined edge of the plate, and in the embodiment illustrated two teeth are shown at one side of the cutting bar, the remaining teeth being eliminated for the sake of clarity.

It will be evident that the projecting reciprocable teeth of the cutting element will engage the grain and cut the same, and that the grain will pass over the plate C and be engaged by the reel and delivered to that portion of the apron on which the grain should be collected.

With the ordinary rectangular shaped flat slats, the impact of the slat with the grain has a tendency to shell the grain, and moreover it has a further tendency of throwing the grain back too far on the endless apron D, whereas when the slats are formed curvilinear in cross section they have more of a bending action on the grain and cause the said grain to lie over and be deposited on the endless apron D in the manner best calculated to increase the efficiency of the machine.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

In a binder and in combination with a cutting bar, a metallic plate adapted to fit above the bar having its front edge overhanging the cutting knives of the bar inclined relatively to the back portion of the plate, and a reel having slats of sheet metal convexed longitudinally.

In witness whereof I have hereunto set my hand in the presence of two witnesses.

JOHN ALBERT CALVERT.

Witnesses:
 REGINALD R. WRIGHT,
 HAROLD RICHMOND HOOPER.